Nov. 6, 1962  R. P. SMITH  3,062,579
EXPANDING TRAILER
Filed Sept. 16, 1959  7 Sheets-Sheet 1

INVENTOR.
RAYMOND P. SMITH
BY
Barnes, Kisselle, Raisch & Choate
ATTORNEYS

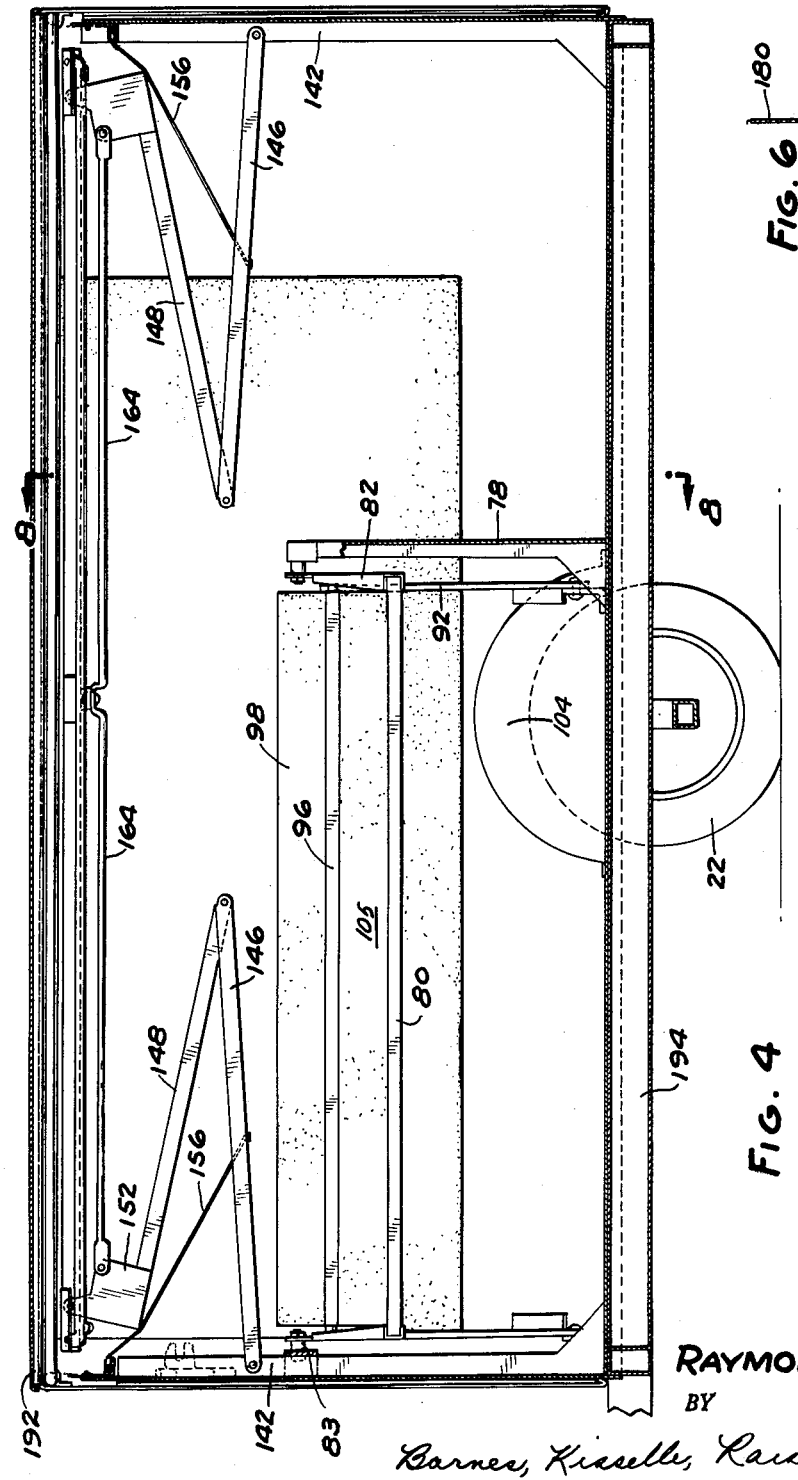
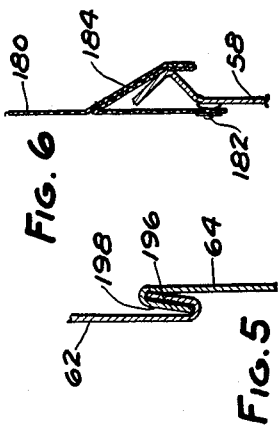

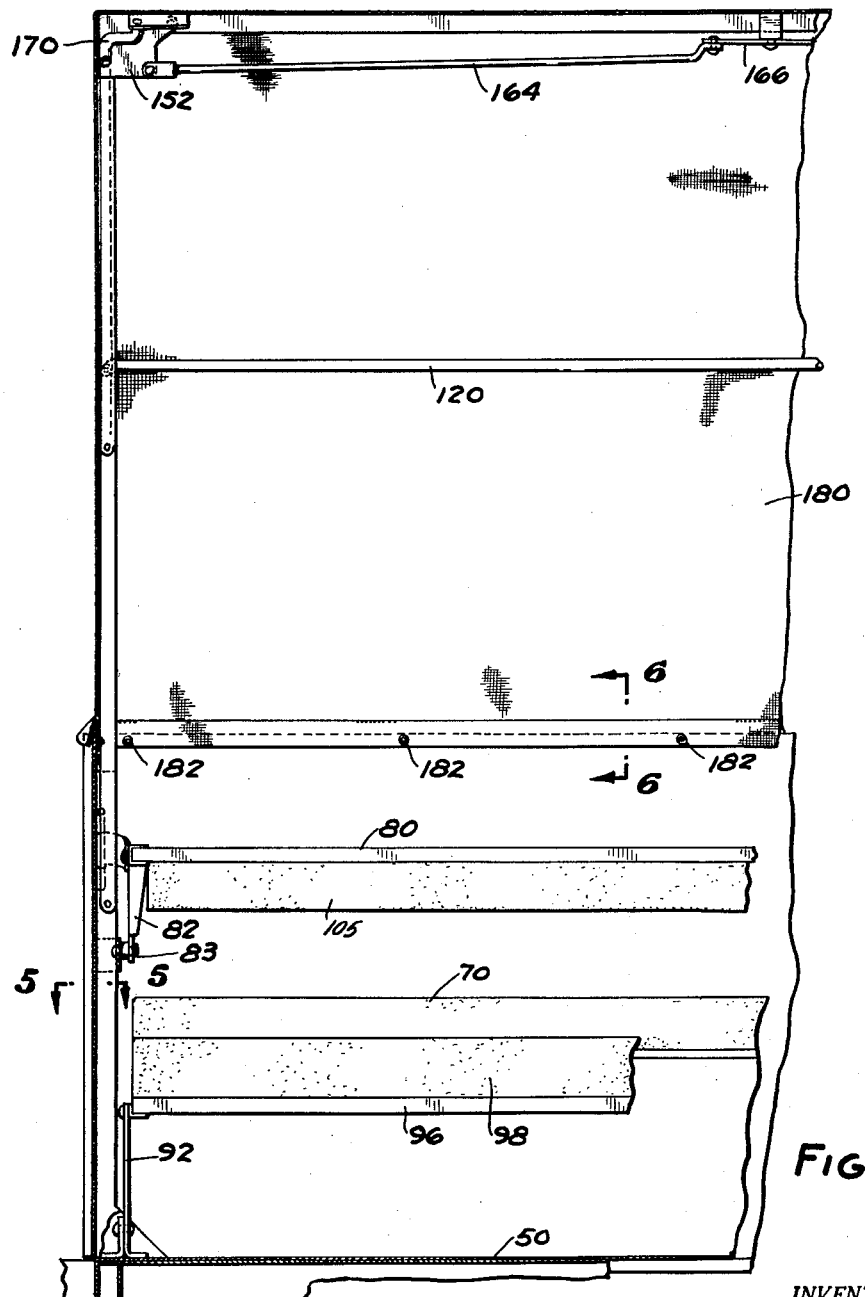

Nov. 6, 1962  R. P. SMITH  3,062,579
EXPANDING TRAILER
Filed Sept. 16, 1959  7 Sheets-Sheet 4
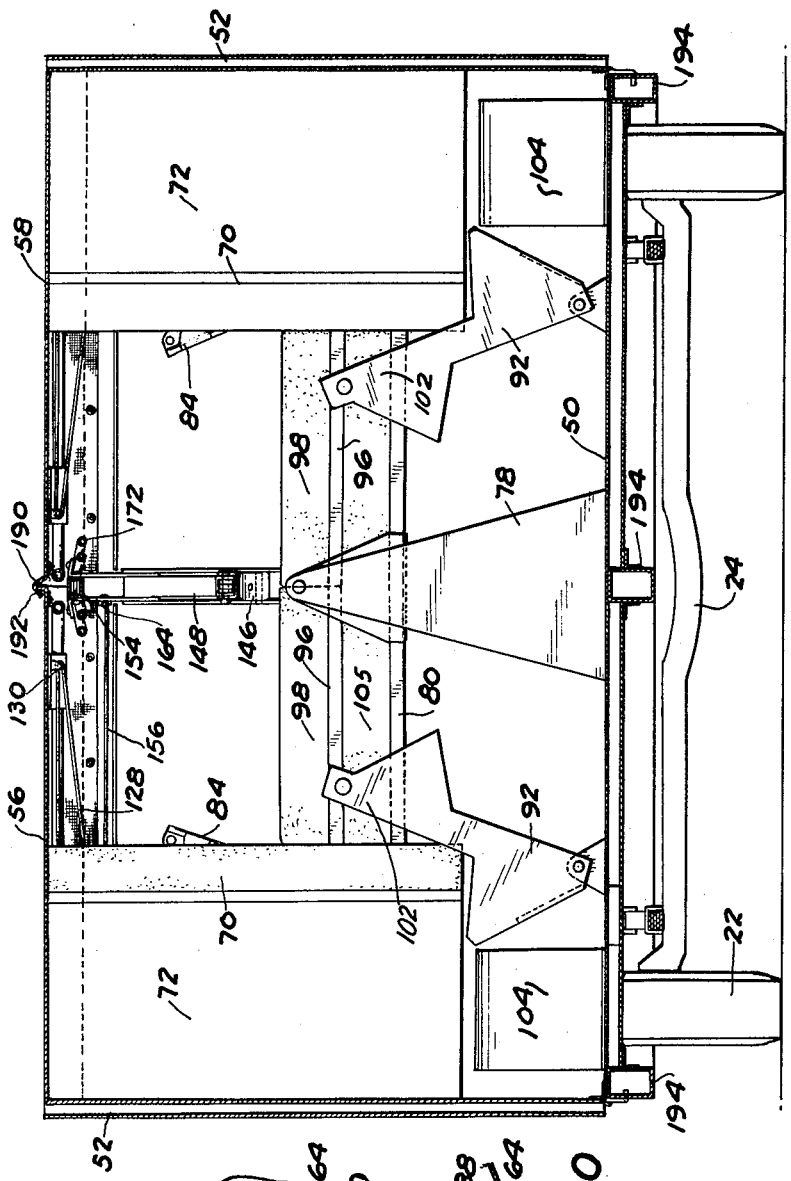
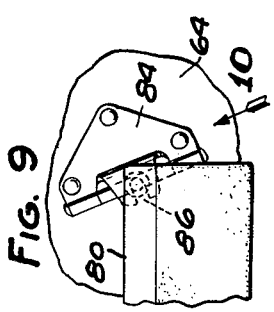
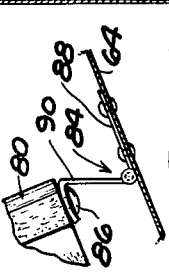
INVENTOR.
RAYMOND P. SMITH
BY
Barnes, Kisselle, Raisch & Choate
ATTORNEYS

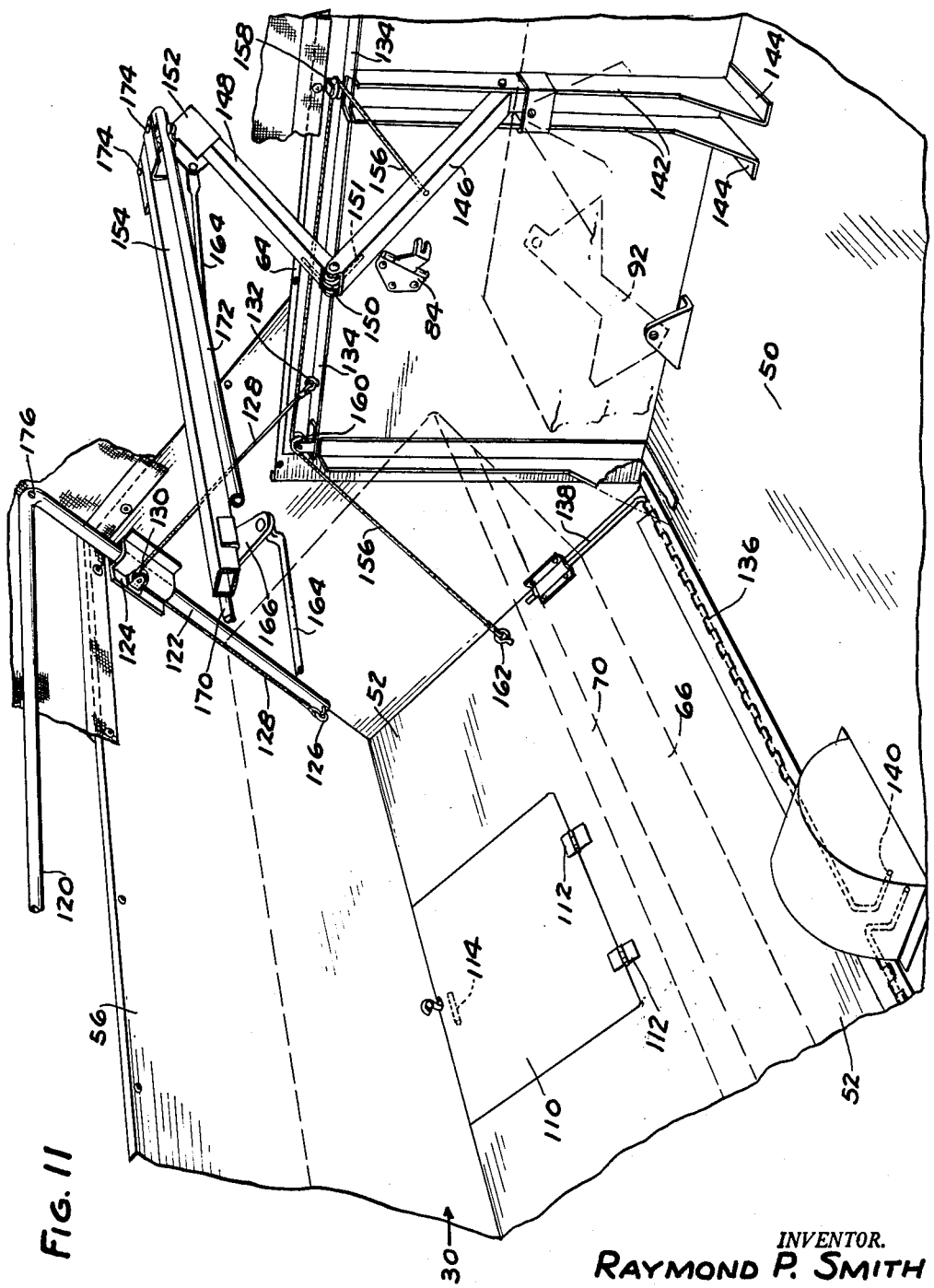

Nov. 6, 1962 R. P. SMITH 3,062,579
EXPANDING TRAILER
Filed Sept. 16, 1959 7 Sheets-Sheet 7

INVENTOR.
RAYMOND P. SMITH
BY
Barnes, Kisselle, Raisch & Choate
ATTORNEYS

United States Patent Office 3,062,579
Patented Nov. 6, 1962

3,062,579
EXPANDING TRAILER
Raymond P. Smith, 10825 La Salle, Huntington
Woods, Mich.
Filed Sept. 16, 1959, Ser. No. 840,287
26 Claims. (Cl. 296—23)

This invention relates to an expanding trailer for camping purposes.

It is an object to provide a trailer which has normal road size for traveling purposes and which in its inherent design contains a structure which permits expansion to a composite tent trailer combination which is completely enclosed and extremely easy operated to its expanded condition.

It is a further object to provide a trailer which in its inherent construction contains furniture units which nest together in the folding operation to permit a compact traveling arrangement and which is readily adapted to use when unfolded.

Other objects and features of the invention relate to the details of the bracing construction for the flexible portions of the unit so that it presents a rigid and attractive appearance upon unfolding without the necessity of any outside stay ropes or stakes.

Another object of the invention is the use of a composite flexible fold and rigid wall structure which is readily fastened together and suitably designed to create a complete water-shedding construction.

Other objects and features of the invention relating to details of the unfolding structure and reinforcing and balancing devices to permit ease of operation will be apparent in the following description and claims.

Drawings accompany the disclosure and the various views thereof may be briefly described as:

Figure 1:
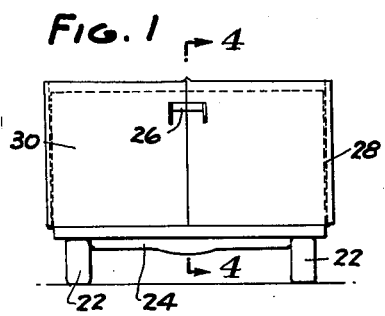
FIGURE 1 illustrates a rear view of the trailer showing it in folded condition.

FIGURE 4, a sectional view on line 4—4 of FIGURE 1 partially in elevation.

FIGURE 5, a sectional view on line 5—5 of FIGURE 7.

FIGURE 6, a sectional view on line 6—6 of FIGURE 7.

Figure 2:
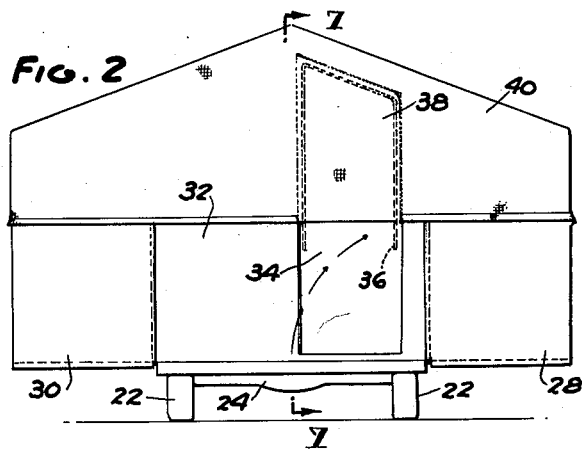
FIGURE 2 illustrates a rear view of the trailer in unfolded condition.

FIGURE 7, a vertical sectional view of FIGURE 2.

FIGURE 8, a sectional view taken on line 8—8 of FIGURE 4.

FIGURE 9, a detail of a table bracket construction.

FIGURE 10, an end view of the bracket of FIGURE 9 taken on line 10 of FIGURE 9.

FIGURE 11, a perspective view showing the mechanism which facilitates the opening of the device.

Figure 12:
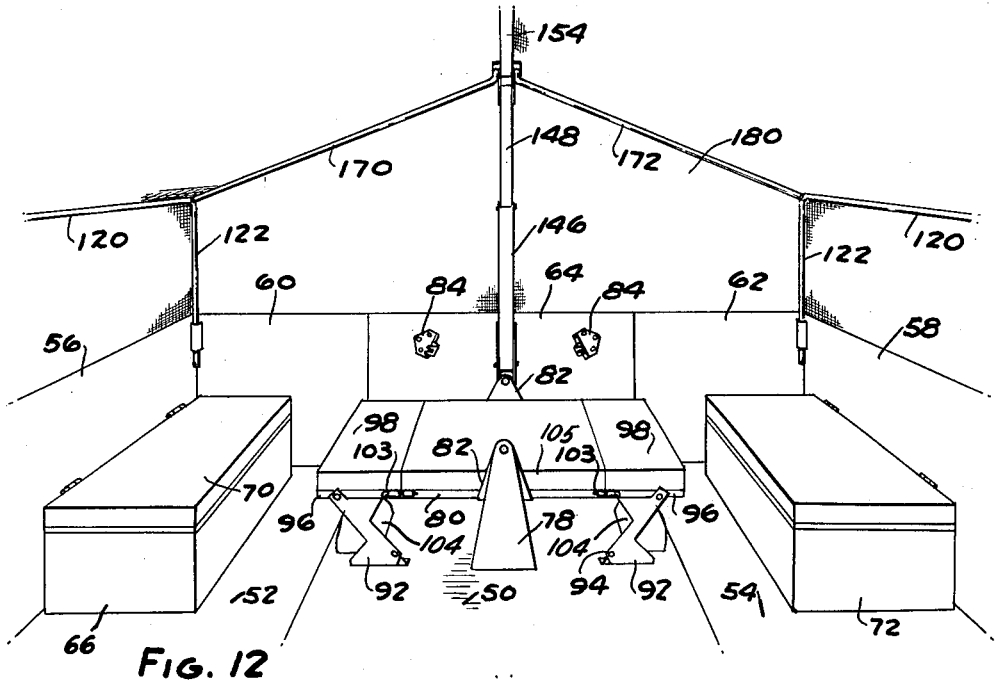

FIGURE 12, a view of the interior of the unit with the furniture elements arranged for sleeping purposes.

Figure 13:
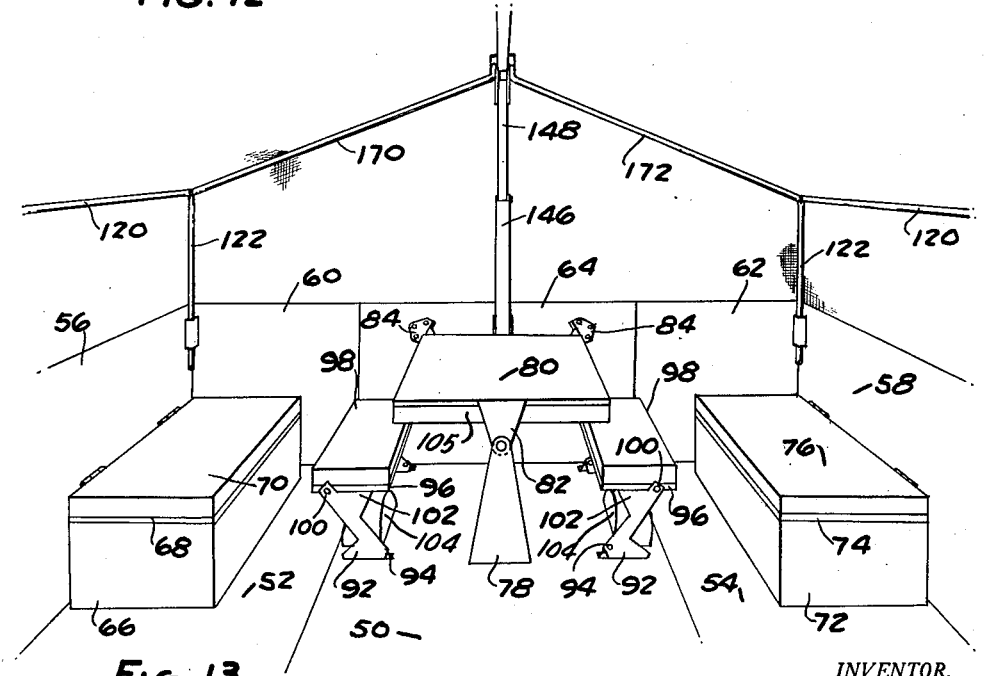

FIGURE 13, an interior view showing the furniture arranged for table use.

Figure 14:
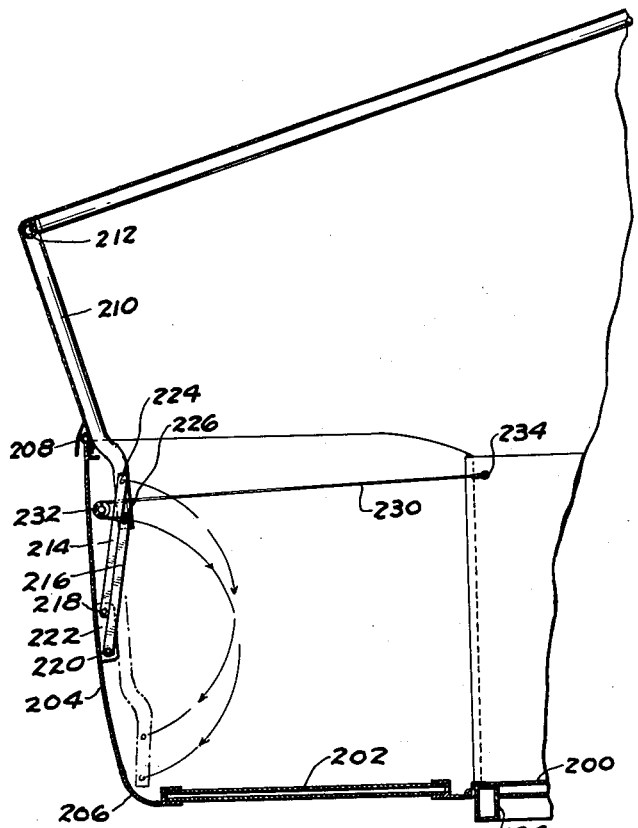

FIGURE 14, a modified view of the device with a slightly different housing construction to create an overhang on the opening sides and a rounded corner look on the closed unit.

Figure 15:
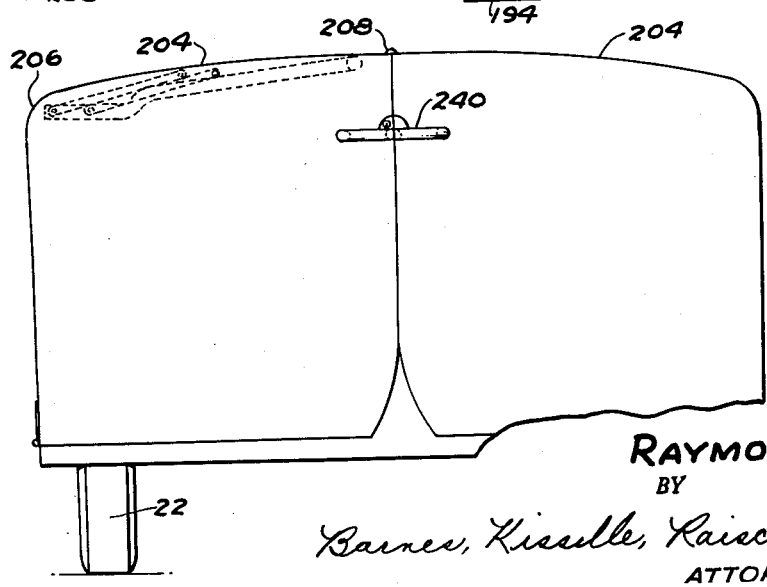

FIGURE 15, a view of the modified unit in closed position.

Referring to the drawings:

In FIGURE 1 the trailer unit shown generally at 20 has wheels 22 with a suitable axle 24, the trailer being in folded position with a latch 26 to hold the folded side casings together.

In FIGURE 2, the unit is shown in opened position with side casing 28 and 30 being opened out so that the portion which originally in the folded position was a vertical side of the unit now forms a bottom panel. The openings of the sides 28 and 30 expose an end wall 32 on the basic trailer chassis frame in which a hinged door panel 34 is mounted. This door panel has a U-shaped frame member 36 with the ends socketed in the door rising above the door to support a flexible upper door structure 38 to close a door opening in the flexible upper structure 40 which serves as a tent top for the entire unit.

Figure 3:
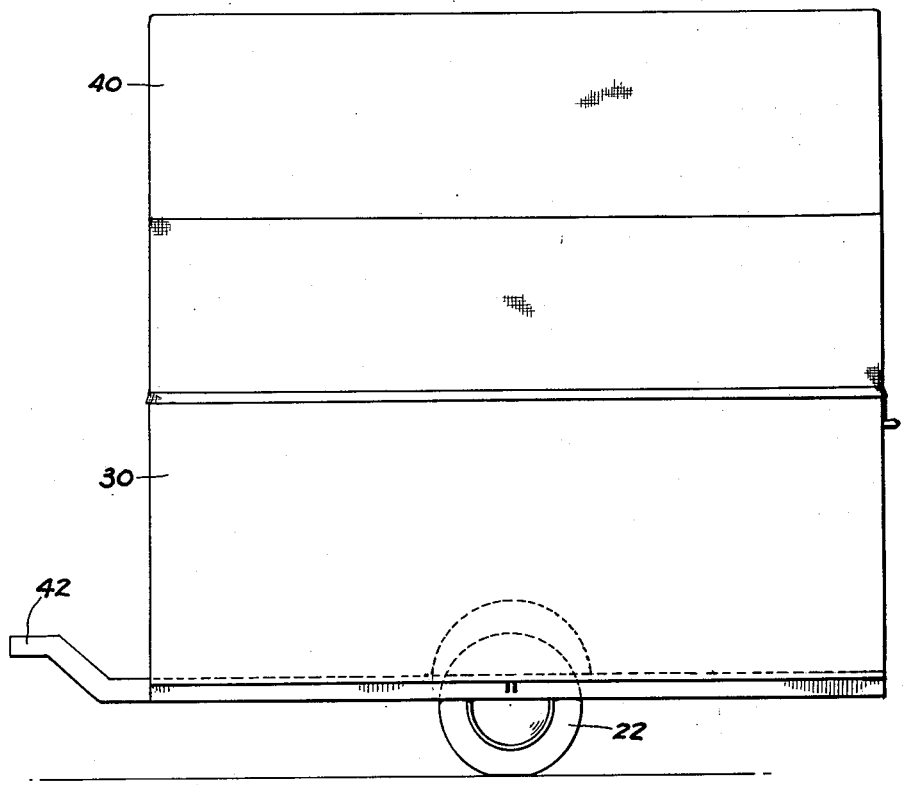
FIGURE 3 is a side view of the trailer in open position.

The upper structure is suitably supported by frame members which will be later described. The material used for the upper structure can be a tent canvas or some other suitable flexible material which has good weathering properties. Suitable window openings can be fashioned into the flexible upper structure 40 as desired. As shown in FIGURE 3 a suitable trailer hitch 42 can be used for the unit.

Reference is now made to FIGURES 12 and 13 which show a general view of the interior of the unit which has a chassis plate 50 serving as a floor centrally of the unit, a left-hand floor panel 52 which forms an outer wall in folded position and a right-hand floor panel 54 which forms an outer wall in folded position. A vertical panel 56 forms a portion of the top of the trailer in folded position, and a vertical panel 58 on the right-hand side completes the top construction in folded position. At the ends of panels 52 and 56 is an end panel 60 and at the end of panel 54 and 58 is an end panel 62, each of which cooperates with an end panel 64 rising vertically from the central floor panel 50.

On floor panel 52 is a chest unit 66 having a solid cover 68 covered with a cushion 70. On the right-hand side of the trailer the same storage unit is found at 72 with a hard top panel 74 and a cushion 76. A table bracket 78 is mounted on floor 50 to support one end of a table panel 80 which is mounted on a triangular gusset 82. The other end of the table is mounted on a pivot 83 as shown in FIGURE 7. The table is stabilized by a bracket element 84 at each corner on wall 64, this bracket element being shown in detail in FIGURE 9. It will be seen that a pin 86 locks into the bracket to stabilize the table in its horizontal position. The bracket 84 comprises a plate 88 on wall 64 and the hinged locking portion 90 which has a recess for spring engagement with the bolt heads 86.

Seat brackets 92 are pivoted at 94 on each side of the table, these seats having a supporting panel 96 with a cushion 98. The unusual Z configuration of the seat brackets 92 gives them a stability, the panel 96 being pivoted at 100 and the portion 102 of the bracket serving as a support for the forward portion of the panel 96. These seats normally position over the wheel housings 104 but are so designed that they can be shifted as will be later described for storage purposes.

Referring to FIGURE 12, the table and seat combination is shown in position as a bed. The seats are in the same position as for dining, but the table portion 80 has been released from the brackets 84 and pivoted on gussets 82 to a horizontal position in inverted relation at a lower level so that a cushion portion 105 likewise levels with the cushion portions 98 of the seat. The seat portions serve to stabilize the bed panel in FIGURE 12 and suitable latching devices 103 can be used for unifying the panels 80 and 96 into a solid bed structure.

If reference is now made to FIGURE 8, it will be seen that in folded position the seat panels 96 have been lifted at the front edge and the supports 92 have been tipped forwardly so the seat benches actually overlie the table in its downward bed position. This permits the side couches to be folded into a position over wheel housings 104 and to abut against the edges of the table and the benches to thus nest in a compact and tight folded position.

The storage units 72 have an outside access door 110, FIGURE 11, suitably hinged at 112 and latched at 114. When the trailer is in road condition, articles in compartments 72 can be reached through these opening panels 110. Suitable locks on the door latches can be provided.

Referring now to the mechanism for supporting the extended top of the device, reference is made to FIGURES 11, 12 and 13. U-shaped side brackets are composed of a horizontal run 120 and vertical arms 122 on each side of the device. The vertical arms 122 are supported in each corner of the device by a guide member 124 which serves also as a stop for the upward motion. It will be noted in FIGURE 11 that the bottom of the arm 122 is connected at 126 to a cable 128 which passes over a pulley 130 anchored at 132 on an angle 134 extending horizontally across the panel 64.

It will be seen, therefore, that as the side units 28 and 30 are folded outwardly, tension on the cable 128 will cause a raising of the arm 122 and thus a raising of the horizontal bar 120 which moves it up to form the side corner of the roof structure.

The bottom panel 52 of the side structure 30 is shown hinged in a piano hinge construction at 136. The pintle pin passes through the hinge 136 and has arms 138 anchored to the panel 52 and the other end 140 suitably anchored at the wheel housing so that the pintle pin can serve as a torsion bar and counterbalance for the opening and closing operation. Other types of spring counterbalances can be used if desired.

The ridge pole construction is shown also in FIGURE 11 in partially erected position. The base of the vertical support for the ridge pole is a double angle bracket 142 anchored on the floor panel 50 at 144 and connected at the top to the angle 134. Just above the central portion of the brackets 142 is the first pivot arm 146 of a knee action member having an upper arm 148, the two being pivoted at 150. A loop arm spring 151 inside the joint 150 is under compression when the knee joint is closed in order to provide an assist in the opening action. It may also be under compression in full open position, thus providing an assist in closing the frame work.

At the top of the arm 148 is a box bracket 152 connected in a pivotal relation to the ridge pole 154. The lower arm 146 is anchored to a cable 156 which passes around a pulley 158 and over a pulley 160 to an anchor point 162 on panel 52. Thus the opening action of the side section 30 will cause tension to be placed on the cable 156 thus causing the opening action on the knee parts 146 and 148 raising the ridge pole 154 to support the top tent structure in taut position. The arms 148 in collapsed position lie in the space occupied by the table 80 in the upper position.

In order to stabilize the ridge pole as it is moving upwardly, suitable rods 164 are connected to the box structure 152 at one end and to a pivoting cross arm 166 at the center of the ridge pole, thus causing the device to be stabilized as it moves upwardly. Side arms 170 and 172 are pivoted to the ridge pole at 174 at the ends, these arms being adapted to be swung out and manually locked to the side brackets 120 at the corner 176. These end arms 170 and 172 are shown in position in FIGURE 12. The hoisting cables 156 need be associated with only one side assembly to obtain the necessary tension to hoist the unit. With the swinging out of the side arms 170 and 172 to lock against the bars 120, the device is stabilized in position.

The top canvas is connected to the sides and the ends as shown in FIGURE 6 with a side wall of the canvas 180 being anchored by suitable buttons 182 to the inside and end walls with a weather flap 184 overlapping the outside of the metal walls of the unit to provide proper water drainage. The construction as illustrated is such that the canvas can remain fastened to the walls and need not be unsnapped when the device is collapsed and folded.

As shown in FIGURE 8, the side wall 58, which forms the top of the folded unit, has an angled flange portion 190 which overlies an angled portion 192 to form a sealed joint for the two sides as they join across the top of the folded unit. A suitable frame structure 194 is provided for the bottom 50. The end walls join as shown in FIGURE 5, the walls 62 having an engaging flange 196 which locks with an engaging flange 198 on the end wall 64. Thus the side wing boxes completely envelop and enclose the structure in folded position.

It will thus be seen that when it is desirable to raise the unit to provide sleeping quarters after a day's run, it is necessary only to unlock the latch 26 and swing the two side boxes 28 and 30 outwardly. This simultaneously raises the side bars 120 and the ridge pole 154 through the action of the respective cables 128 and 156. When the poles 170 and 172 are snapped in to the side bars 120, the device is stabilized for use.

The furniture can then be arranged as desired either for sleeping, as shown in FIGURE 12, or for eating as shown in FIGURE 13. Other camping equipment can be placed in the rear end of the trailer such as suitable stoves, storage cabinets, refrigeration, etc.

In FIGURES 14 and 15 a similar structure has been shown with a slightly different design. As shown in FIGURE 14 the main bottom panel 200 has a supplemental bottom panel 202 which forms the outer side when folded. The panel 204 has a curved configuration which straightens out into a gradual curve from a corner portion 206 so that when the device is folded the top corners of the unit present a pleasing rounded appearance. The suitable overlapping flange 208 is provided. The vertical arms 210 for the side poles 212 extend outwardly at an angle so that there is a considerable overhang of the top tent structure from the main body portion. This provides an eave construction which creates a little more shade in the sun and also provides better water run-off.

FIGURES 14 and 15 also illustrate a modified type of raising mechanism for the side units 210 and 212. This consists of a parallelogram construction in which two parallel bars 214 and 216 are pivoted at 218 and 220 on the side bracket 222. These bars are also pivoted at 224 and 226 on the top arm 210 and the structure is raised by a cable 230 passing over a pulley 232 and anchored at 234 on the center end panel. A suitable handle and lock 240 is again provided for this unit.

I claim:

1. An expandable and contractible living quarters unit for use on trailers and truck bodies and the like which comprises a chassis plate serving as a basic floor element, support means on each end of said plate, and one or more side boxes having end walls, side walls and floor walls pivoted to said chassis plate whereby the bottom plate of said side boxes forms a level continuation of said chassis plate as a floor element in open position and forms a side wall for the unit in collapsed position, the floor walls, side walls and end walls of said side boxes forming a complete closing cover for the unit when in collapsed condition, and means on said support means of said plate for supporting a flexible cover for said trailer element in open position, said means being collapsible into said trailer unit when the side boxes are folded to enclose the chassis element said means being mechanically connected with the side boxes and actuated by the opening movement thereof to cover supporting position.

2. An expandable and contractible living quarters unit for trailers, truck bodies and the like which comprises a chassis plate serving as a basic floor element, side boxes comprising side walls and floor walls pivoted to said chassis plate whereby the floor walls of said side boxes form side walls for the unit in collapsed position, a longitudinal furniture piece on each said side box to serve as a seat or bed as desired and movable with said side boxes to a storage position, a combination bed and table unit on said chassis plate comprising a central unit including a main panel selectively positionable at one height to serve as a bed and at another height to serve as a table, common mounting brackets supported on said chassis plate to facilitate the selective positioning of said main panel, bench elements to serve as lateral extensions of said main panel at bed height and to serve as seats adjacent the main panel when at table height comprising horizontal panels, means for mounting said horizontal bench panels to permit a seat position adjacent said main panel and a raised storage position over and parallel with said main panel in its lowermost position, said longitudinal furniture pieces being positioned to lie laterally spaced from said bench panels in the seat position and to lie adjacent the outer edges of the parallel main panel and the bench panels in storage position.

3. A device as defined in claim 2 in which a collapsible ridge pole is mounted on the chassis plate for supporting a flexible cover, said ridge pole comprising a horizontal beam to move vertically from a storage position within the unit to a supporting position above the unit, a mounting bracket on said chassis plate at each end thereof and a toggle lift construction comprising two pivotal members mounted on said mounting bracket, one of which is associated with said ridge pole wherein an opening action of said toggle causes a lifting of said ridge pole into its upper supporting position, said pivotal members moving from a storage position directly above said table in storage position to a vertical position at the ends of the unit.

4. A device as defined in claim 3 in which a spring is mounted between the pivotal members to counterbalance the weight of the flexible cover and the ridge pole.

5. A device as defined in claim 3 in which the ridge pole is hoisted by a cable means anchored to one of said side boxes and passing over pulleys to an anchor point on one of said toggle members wherein an opening motion of said side box causes an opening of said toggle elements to a vertical position.

6. A device as defined in claim 3 in which the means for supporting a flexible cover comprises in part side bars mounted in parallel relation to the top edges of said side boxes and means to lift said side bars vertically to a raised supporting position comprising a mechanism mounted on said side boxes for movably supporting said side bars in a lowered position for collapsing and a raised position for a support.

7. A device as defined in claim 3 in which a stabilizing assembly is associated with said ridge pole and said toggle supporting means to afford longitudinal stability to said means in the raising and lowering motions of said ridge pole.

8. A device as defined in claim 3 in which a resilient means is associated with said chassis plate and said side boxes to assist in the opening closing motions of said side boxes.

9. A device as defined in claim 3 in which the flexible cover overlying the trailer in open position comprises a flexible waterproof and weatherproof material overlying the entire open chassis plate and side boxes having a double edge extending around and fastened to the periphery of the open unit, one portion of said edge being anchored to the inside of the periphery of the side and end walls of the unit and other portions of the edge overlying the edges of said end walls and said side walls to provide a water shed.

10. A device as defined in claim 6 in which actuating means is associated with said mounting means wherein opening motion of said side boxes causes a raising motion of said side bars.

11. A device as defined in claim 6 in which framing members are pivotally mounted on said ridge pole and engageable with said side bars to lock the parts together in the expanded position.

12. An expandable and contractible living quarters unit for trailers, truck bodies and the like which comprises a chassis plate serving as a basic floor element, side boxes comprising side walls and floor walls pivoted to said chassis plate whereby the floor walls of said side boxes form side walls for the unit in collapsed position, a longitudinal furniture piece on each said side box to serve as a seat or bed as desired and movable with said side boxes to a storage position, a combination bed and table unit on said chassis plate comprising a central unit including a single main panel selectively positionable at one height to serve as a bed and at another height to serve as a table, a pivoting mounting bracket at each end of said panel affixed at one end to the respective ends of said panel and pivoted at a point spaced from the plane of said panel to a mounting means on said chassis plate such that the panel may swing from a high position to an inverted low position, bench elements to serve as lateral extensions of said main panel at bed height and to serve as seats adjacent the main panel at table height comprising horizontal panels, means for mounting said horizontal bench panels to permit a seat position adjacent said main panel and a raised storage position over and parallel with said main panel in its lowermost position, said longitudinal furniture pieces being positioned to lie laterally spaced from said bench panels in the seat position and to lie adjacent the outer edges of the parallel main panel and the bench panels in storage position.

13. An expandable and contractible living quarters unit for trailers, truck bodies and the like which comprises a chassis plate serving as a basic floor element, side boxes comprising side walls and floor walls pivoted to said chassis plate whereby the floor walls of said side boxes form side walls for the unit in collapsed position, a longitudinal furniture piece on each said side box to serve as a seat or bed as desired and movable with said side boxes to a storage position, a combination bed and table unit on said chassis plate comprising a central unit including a single main panel having a bed cushion on one side and a table surface on the other selectively positionable at one height to serve as a bed and at another height to serve as a table, common mounting brackets on said chassis plate to facilitate the selectively positioning of said main panel, cushioned bench elements to serve as lateral extensions of said main panel at bed height and to serve as seats adjacent the main panel at table height comprising horizontal panels, means for mounting said horizontal bench panels to permit a seat and bed extension position adjacent said table and a raised storage position over and parallel with said main panel in its lowermost position, said longitudinal furniture pieces being positioned to lie laterally spaced from said bench panels in the seat position and to lie adjacent the outer edges of the parallel main panel and the bench panels in storage position.

14. An expandable and contractible living quarters unit for trailers, truck bodies and the like which comprises a chassis plate serving as a basic floor element, side boxes comprising side walls and floor walls pivoted to said chassis plate whereby the floor walls of said side boxes form side walls for the unit in collapsed position, a longitudinal furniture piece on each said side box to serve as a seat or bed as desired and movable with said side boxes to a storage position, a combination bed and table unit on said chassis plate comprising a central unit including a double-sided, single main panel selectively positionable at one height to serve as a bed and inverted at another height to serve as a table, common mounting brackets on said chassis plate to facilitate the selective positioning of said panel, bench elements to serve as lateral extensions of said main panel at bed height and to serve as seats adjacent the table comprising horizontal panels, means for mounting said horizontal bench panels comprising brackets pivoted on the chassis plate adjacent the forward side of the bench panels facing the main panel and pivoted at the bench panels rearwardly thereof away from the main panel to permit a seat position adjacent said main panel at table height and a raised storage position over and parellel with said main panel in its lowermost position, said longitudinal furniture pieces being positioned to lie laterally spaced from said bench panels in the seat position and to lie adjacent the outer edges of the parallel main panel and the bench panels in storage position.

15. A device as defined in claim 14 in which the means for mounting the horizontal bench panels comprises Z-shaped brackets at each end of said bench panels, said brackets being pivoted at the corner of the bottom run of the Z to the chassis plate and at the corner of the top run of the Z to the rear end of the bench panels, the lower run of the Z serving as a bottom rest and the upper run of the Z serving as a top rest to support the bench panels.

16. An expandable and contractible living quarters unit for trailers, truck bodies and the like which comprises a chassis plate serving as a basic floor element having wheel housings on each side thereof projecting upwardly from the floor element, side boxes comprising side walls and floor walls pivoted to said chassis plate whereby the floor walls of said side boxes form side walls for the unit in collapsed position, a longitudinal furniture piece on each said side box to serve as a seat or bed as desired and movable with said side boxes to a storage position above said wheel housings, a combination bed and table unit on said chassis plate comprising a central unit including a double-sided, single main panel mounted between said wheel housings and selectively positionable at one height to serve as a bed and at another height to serve as a table, mounting brackets on said chassis plate to facilitate the selective positioning of said panel, bench elements to serve as lateral extensions of said main panel in the bed position and to serve as seats adjacent the main panel in the table position comprising horizontal panels, means for mounting said horizontal bench panels to permit a seat position adjacent said main panel and overlying said wheel housing and a raised storage position over and parallel with said main panel in its lowermost position, said longitudinal furniture pieces being positioned to lie laterally spaced from said bench panels in the seat position and to lie adjacent the outer edges of the parallel main panel and the bench panels and over the wheel housings in storage position.

17. An expandable and contractible living quarters unit for use on trailers and truck bodies and the like which comprises a chassis plate serving as a basic floor element, end walls on said plate, and one or more side boxes having end walls, side walls and floor walls pivoted to said chassis plate whereby the bottom plate of said side boxes forms a level continuation of said chassis plate as a floor element in open position and forms a side wall for the unit in collapsed position, the floor walls, side walls and end walls of said side boxes forming a complete enclosing cover for the unit when in collapsed condition, and means on said end walls for supporting a flexible cover for said trailer element in open position, said means being collapsible into said trailer unit when the side boxes are folded to enclose the chassis element, said means for supporting seat flexible cover comprising a ridge pole extending the length of said chassis plate movable up and down thereon, a pair of knee action toggle members at each end of said chassis plate on the end walls of the unit, said toggle members being movable toward each other into the space confined by the walls of the contracted unit and being movable outwardly to a vertical position adjacent the end walls of the unit, one toggle member of each pair being articulated to the ridge pole and one being articulated to an end wall on said chassis plate, means to support each side of said flexible cover comprising a frame member slidable vertically in relation to each of said side boxes from a collapsed position to a hoisted position and mounted on said side boxes, and means connecting said toggle means with at least one of said side boxes and said frame members with said end plates, whereby opening motion of said side boxes causes a simultaneous mechanical raising of said ridge pole and said frame members and the resultant raising of said flexible cover, said cover being fastened to the upper edges of said side boxes and said end plates of said unit in a water shedding relation.

18. An expandable and contractible living quarters unit for use on trailers and truck bodies and the like which comprises a chassis plate serving as a basic floor element, end walls on said plate, and one or more side boxes having end walls, side walls and floor walls pivoted to said chassis plate whereby the floor wall of each side box forms a level continuation of said chassis plate as a floor element in open position and forms a side wall for the unit in collapsed condition, the walls of said side boxes forming a complete and closing cover for the unit when in collapsed condition, means movably mounted on said walls for supporting a flexible cover for said unit in open position, said means being movable relative to said walls and in response to motion of said side boxes to move from a supporting position when the unit is in open position to a collapsed position within the unit when the side boxes are folded to enclose the unit, means mechanically connected with said supporting means and with said side boxes to actuate said supporting means in response to opening motion of said side boxes, a combination bed and table unit comprising a main panel, means mounting said main panel on said chassis plate to permit said main panel to assume a high position to serve as a table and an inverted low position to serve as a bed, bench panels pivotally mounted on said chassis plate adjacent said main panel to serve as lateral extensions of said panel in the low position and to serve as seats adjacent the panel when in the high position, and means for mounting said bench panels comprising brackets pivoted on the chassis plate and on the bench panels to permit the bench panels to move toward and over the main panel when in its low position to nest above the main panel when the side boxes are moved to closed position.

19. A device as defined in claim 18 which includes brackets mounted on the interior surface of one of the end walls on said chassis plate cooperable with locking means on said main panel to stabilize the main panel in its high position.

20. A device as defined in claim 18 in which means on said main panel and on said bench panels are provided to lock said panels together in horizontal alignment in the low position of said main panel to serve as a bed.

21. A device as defined in claim 18 in which the means for supporting the bench panels are provided with a stabilizing surface adjacent the chassis plate and a stabilizing surface adjacent the bench panels to solidly locate the bench panels except in storage position.

22. A device as defined in claim 18 in which supplementary seat panels are provided on each side box raised from the floor of said side box positioned to locate directly beside said main panel and said bench panels in nested position when the side boxes are closed.

23. A device as defined in claim 18 in which storage cabinets are provided on each side box overlying the floor wall of said side boxes and having a cover to serve as supplementary seating space, said storage cabinets being positioned to locate directly beside said main panel and said bench panels when said side boxes are in closed position, and an outside access door in the floor wall of said side boxes to allow access to the space within said storage cabinets from the side of the closed unit when the side boxes are in closed position.

24. A multiple sleeping and eating arrangement for a vehicle housing compartment which comprises a floor panel to serve as a portion of a vehicle, a combined table and bed unit comprising a unitary main panel to be mounted in spaced relation to said floor panel, single-axis pivotal means supported on said floor panel having the axis spaced from the plane of said main panel and from the floor panel, means rigidly connected to said main panel and pivoted at the axis of said pivotal means to permit said main panel to swing to a lower level horizontal position below said axis where it may serve as a portion of a bed and to an inverted upper level horizontal position above said axis where it may serve as a table, bench panels mounted adjacent said main panel at a height level with the lower level horizontal position of said main panel to serve as seats for a table use and side extensions for bed use, and means for mounting said benches on said floor panel.

25. A multiple sleeping and eating arrangement for a vehicle housing compartment which comprises a floor panel to serve as a portion of a vehicle, a combined table and bed unit comprising a single main panel to be mounted in spaced relation to said floor panel, pivotal means supported on said floor panel on an axis spaced from the plane of said main panel, means connecting said main panel and said pivotal means to permit said main panel to swing to a lower level horizontal position below said pivotal means where it may serve as a portion of a bed and to an upper level horizontal position above said pivotal means where it may serve as a table, bench panels mounted adjacent said main panel at a height level with the lower level horizontal position of said main panel to serve as seats for a table use and side extensions for bed use, and means for mounting said benches on said floor panel, the means for mounting said benches comprising pivot means adjacent said floor panel and pivot means on said bench panels, said means being spaced horizontally, and supporting members connecting said pivot means adjacent said floor panel and said panel means, said supporting means having horizontal portions extending from said pivot means in opposite directions to provide stability for said bench panels, said supporting means permitting motion of said bench panels to a position above and over said main panel in its lower position.

26. A multiple sleeping and eating arrangement for a vehicle housing compartment as defined in claim 25 in which side boxes are hingedly mounted on each side of said floor panel having walls to fold over the panel to enclose the same, and cabinet means on said side boxes positioned to fold into the space on the floor panel normally occupied by said bench panels after said bench panels are moved to position over the main panel.

References Cited in the file of this patent

UNITED STATES PATENTS

| | | |
|---|---|---|
| 1,233,313 | Cobb | July 17, 1917 |
| 1,715,971 | Wilson | June 4, 1929 |
| 2,225,993 | Hornberger | Dec. 24, 1940 |
| 2,321,177 | Blossom | June 8, 1943 |
| 2,496,055 | King | Jan. 31, 1950 |
| 2,502,024 | Poche | Mar. 28, 1950 |
| 2,686,075 | Steiner | Aug. 10, 1954 |
| 2,833,002 | Cole | May 6, 1958 |

FOREIGN PATENTS

| | | |
|---|---|---|
| 596,528 | Great Britain | Jan. 6, 1948 |
| 1,005,386 | Germany | Mar. 28, 1947 |
| 773,100 | France | Aug. 25, 1934 |
| 1,028,739 | France | Feb. 25, 1953 |
| 1,139,741 | France | Feb. 18, 1957 |
| 1,146,892 | France | May 27, 1957 |
| 1,147,293 | France | June 3, 1957 |